US011891899B1

(12) United States Patent
Fowler

(10) Patent No.: US 11,891,899 B1
(45) Date of Patent: Feb. 6, 2024

(54) DUAL ENGINE SYSTEM

(71) Applicant: RTX CORPORATION, Farmington, CT (US)

(72) Inventor: Robert Bruce Fowler, West Palm Beach, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/371,989

(22) Filed: Jul. 9, 2021

Related U.S. Application Data

(60) Provisional application No. 63/050,552, filed on Jul. 10, 2020.

(51) Int. Cl.
F01D 15/12 (2006.01)

(52) U.S. Cl.
CPC ...... F01D 15/12 (2013.01); F05D 2260/4031 (2013.01)

(58) Field of Classification Search
CPC .................................. F02C 7/277; F02C 7/32
See application file for complete search history.

(56) References Cited

U.S. PATENT DOCUMENTS 4,864,812 A * 9/1989 Rodgers .................... F02C 7/32 60/39.15
5,184,458 A * 2/1993 Lampe .................. B64D 41/00 60/39.15
5,363,641 A * 11/1994 Dixon ...................... F02C 6/08 60/788
7,805,947 B2 * 10/2010 Moulebhar .............. F02C 7/32 60/39.163
2006/0260323 A1 * 11/2006 Moulebhar .............. F02C 6/08 60/793
2014/0007675 A1 * 1/2014 Mehrer ................ G01F 23/247 73/295
2018/0202368 A1 * 7/2018 Suciu ..................... F02C 7/275

* cited by examiner

Primary Examiner — Todd E Manahan
Assistant Examiner — David P. Olynick
(74) Attorney, Agent, or Firm — CANTOR COLBURN LLP

(57) ABSTRACT

A dual-engine system of an aircraft that includes at least one main engine is provided. The dual-engine system includes a sustainer engine, a booster engine configured to augment a power output of the sustainer engine, and a gearbox coupled to the sustainer engine and the booster engine. An output of the gearbox is configured to selectively combine the power output of the sustainer engine with the booster engine.

20 Claims, 4 Drawing Sheets

DUAL ENGINE SYSTEM

CROSS-REFERENCE TO RELATED APPLICATION

This application claims the benefit of priority to U.S. Provisional Application No. 63/050,552 filed Jul. 10, 2020, the disclosure of which is incorporated herein by reference in its entirety.

BACKGROUND

The subject matter disclosed herein generally relates to engine systems, and more particularly to a dual-engine system.

Aircraft may use a variety of engine system configurations to provide power. Aircraft engine systems can include one or more main engines that drive one or more propulsors, such as a fan, rotor, propeller, or the like to produce horizontal and/or vertical thrust. Aircraft may also include an auxiliary power unit (APU), typically operated during ground-based operation to generate compressed air to assist in starting the main engines, provide an air source for cabin air, and/or generate electricity for aircraft use. APUs are typically designed to operate for a short period of time until the main engines are operating. The main engines typically have electric generators and other accessories. Further, the main engines can have bleed ports to provide compressed air for air cycle machine operation of the aircraft. As such, an APU is typically not needed after at least one main engine is started.

BRIEF DESCRIPTION

According to one embodiment, a dual-engine system of an aircraft that includes at least one main engine is provided. The dual-engine system includes a sustainer engine, a booster engine configured to augment a power output of the sustainer engine, and a gearbox coupled to the sustainer engine and the booster engine. An output of the gearbox is configured to selectively combine the power output of the sustainer engine with the booster engine.

In addition to one or more of the features described above or below, or as an alternative, further embodiments may include, a booster clutch configured to selectively couple the booster engine to a geartrain of the gearbox.

In addition to one or more of the features described above or below, or as an alternative, further embodiments may include a sustainer clutch configured to selectively couple the sustainer engine to a geartrain of the gearbox.

In addition to one or more of the features described above or below, or as an alternative, further embodiments may include a generator coupled to the gearbox.

In addition to one or more of the features described above or below, or as an alternative, further embodiments may include where the sustainer engine is configured to generate bleed air for the aircraft.

In addition to one or more of the features described above or below, or as an alternative, further embodiments may include where the dual-engine system is configured to supplement the power output of the at least one main engine of the aircraft.

In addition to one or more of the features described above or below, or as an alternative, further embodiments may include where the gearbox includes a sustainer engine interface, a booster engine interface, a generator interface, and a pump/starter interface.

In addition to one or more of the features described above or below, or as an alternative, further embodiments may include a fuel pump coupled to the gearbox and configured to supply fuel to both the sustainer engine and the booster engine, and an oil pump coupled to the gearbox and configured to supply oil to both the sustainer engine and the booster engine.

According to an embodiment, a system of an aircraft includes at least one main engine configured to provide propulsion for the aircraft, a dual-engine system, and a controller. The dual-engine system includes a sustainer engine, a booster engine configured to augment a power output of the sustainer engine, and a gearbox coupled to the sustainer engine and the booster engine. An output of the gearbox is configured to selectively combine the power output of the sustainer engine with the booster engine. The controller is configured to selectively operate either or both of the sustainer engine and the booster engine to supplement the power output of the at least one main engine.

In addition to one or more of the features described above or below, or as an alternative, further embodiments may include where the controller is configured to monitor one or more operating conditions of the aircraft and determine when to operate either or both of the sustainer engine and the booster engine based on the one or more operating conditions.

In addition to one or more of the features described above or below, or as an alternative, further embodiments may include where the controller is configured to start the booster engine prior to starting the sustainer engine.

In addition to one or more of the features described above or below, or as an alternative, further embodiments may include a fuel pump and an oil pump coupled to the gearbox, where the booster engine is configured to drive the fuel pump and the oil pump prior to starting the sustainer engine.

In addition to one or more of the features described above or below, or as an alternative, further embodiments may include where the sustainer engine is configured to provide bleed air and/or drive a generator to start the at least one main engine.

In addition to one or more of the features described above or below, or as an alternative, further embodiments may include where the gearbox is configured to provide a supplemental propulsion output to combine with a primary propulsion output of the at least one main engine.

According to an embodiment, a method includes monitoring one or more operating conditions of an aircraft and determining when to operate either or both of a sustainer engine and a booster engine of a dual-engine system based on the one or more operating conditions. The dual-engine system includes the sustainer engine, the booster engine configured to augment a power output of the sustainer engine, and a gearbox coupled to the sustainer engine and the booster engine. The method also includes operating either or both of the sustainer engine and the booster engine to supplement the power output of at least one main engine of the aircraft.

In addition to one or more of the features described above or below, or as an alternative, further embodiments may include using an output of the dual-engine system to start the at least one main engine.

In addition to one or more of the features described above or below, or as an alternative, further embodiments may include starting the booster engine prior to starting the sustainer engine, and driving, by the booster engine, a fuel pump and an oil pump coupled to the gearbox prior to starting the sustainer engine.

In addition to one or more of the features described above or below, or as an alternative, further embodiments may include driving rotation of the sustainer engine, by the booster engine, through the gearbox to output bleed air from the sustainer engine in an emergency mode of operation.

In addition to one or more of the features described above or below, or as an alternative, further embodiments may include combining a supplemental propulsion output of the dual-engine system with a primary propulsion output of the at least one main engine.

In addition to one or more of the features described above or below, or as an alternative, further embodiments may include providing one or more aircraft power outputs from the dual-engine system to one or more subsystems of the aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
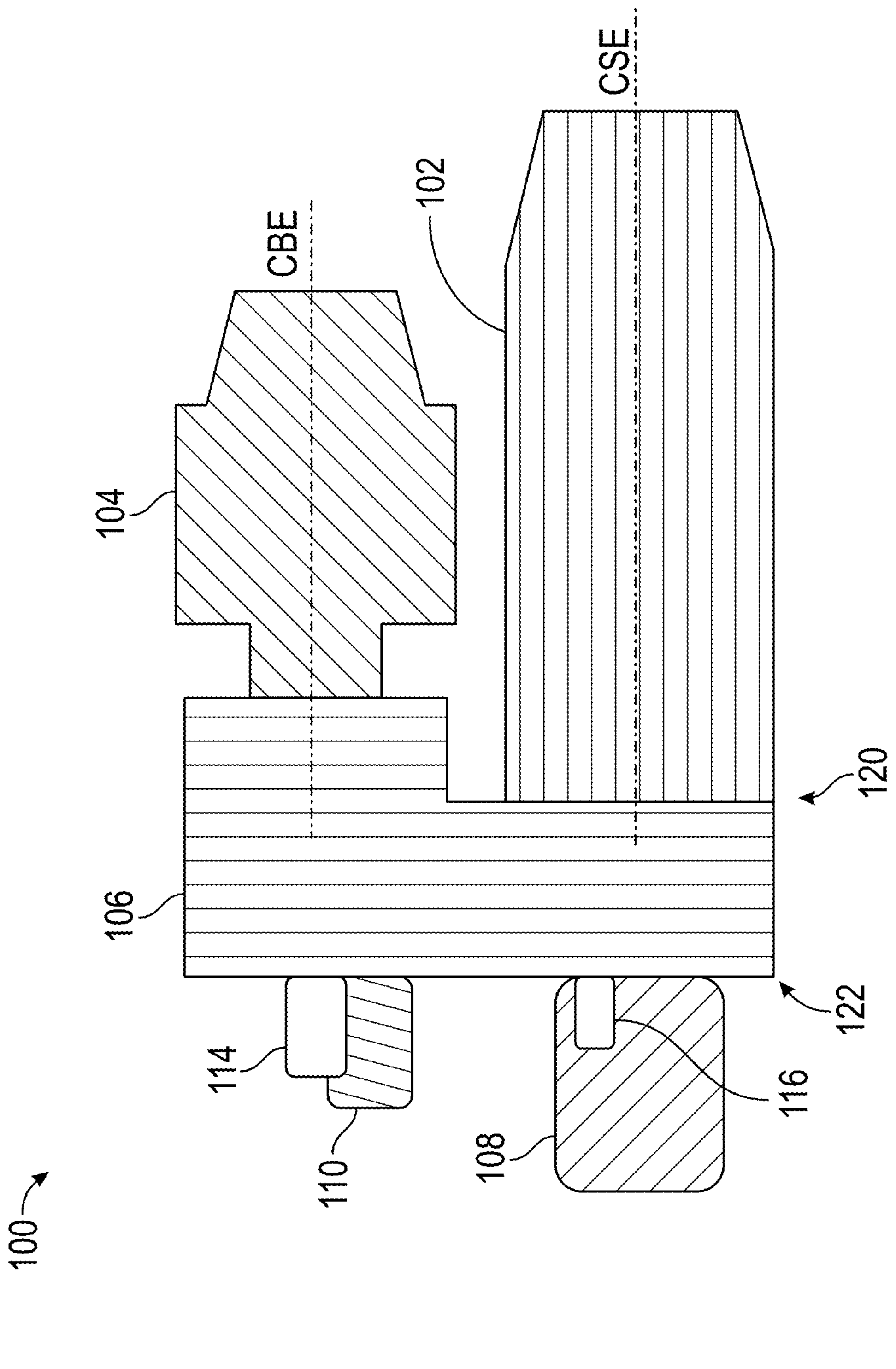
FIG. 1 is a schematic illustration of a dual-engine system in accordance with an embodiment of the disclosure.

FIG. 1 schematically illustrates a dual-engine system 100 according to an embodiment. The dual-engine system 100 is configured to provide sustained and auxiliary power to an aircraft, such as a conventional takeoff and landing aircraft, a short takeoff and vertical landing vehicle, a vertical takeoff and landing vehicle, and the like. Further examples can include fixed and/or rotary wing aircraft including airplanes, drones, helicopters, and other such vehicles. The dual-engine system 100 can supplement power provided by other power sources of an aircraft. For example, primary thrust and/or lift can be provided by one or more main engines (FIG. 3), while the dual-engine system 100 can provide a source of compressed air (e.g., bleed air), electricity generation, one or more pumps (e.g., a hydraulic pump, oil pump, fuel pump, etc.), and/or a power boost under certain operating conditions. Further, one or more drive outputs of the dual-engine system 100 can provide rotary power to one or more aircraft subsystems.

In the example of FIG. 1, the dual-engine system 100 includes a first engine 102, which is also referred to as a sustainer engine 102. The dual-engine system 100 includes a second engine 104, which is also referred to as a booster engine 104. The sustainer engine 102 and the booster engine 104 are both coupled to a gearbox 106. The gearbox 106 can also be coupled to other components, such as a generator 108, a starter/pump 110, a fuel pump 114, an oil pump 116 and other components. The sustainer engine 102 can be configured to operate continuously over a wide range of operating conditions, from ground-based idle operation, to takeoff, climb, cruise, descent, and other such modes of operation across a range of altitudes and flight conditions. As one example, the sustainer engine 102 can provide sufficient horsepower for aircraft bleed air (e.g., compressed air) and electrical requirements for about 70-95% of vehicle mission requirements. The booster engine 104 can be selectively operated to supplement the output of the sustainer engine 102. The booster engine 104 can be a smaller sized and higher horsepower output engine as compared to the sustainer engine 102. As one example, the booster engine 104 may provide about two to four times the horsepower of the sustainer engine 102 for relatively short operating times. Other ranges are contemplated based on system configuration demands As a further embodiment, the sustainer engine 102 and the booster engine 104 may have substantially similar output capabilities.

In some embodiments, the booster engine 104 can be operable in an emergency mode for greater durations. For example, if the sustainer engine 102 experiences a failure condition, the booster engine 104 may be run for a greater time beyond normal operating modes to allow an aircraft to land safely. Where the booster engine 104 does not have air bleed taps available to provide bleed air for the aircraft, in the emergency mode of operation, if the sustainer engine 102 is not otherwise impaired, the booster engine 104 can drive rotation of the sustainer engine 102 through the gearbox 106 to output bleed air from the sustainer engine 102.

Each of the sustainer engine 102 and booster engine 104 can be referred to as auxiliary power units or supplemental power units with respect to the main engine operation of the aircraft in which the dual-engine system 100 is installed. One or more clutches can be installed within the gearbox 106 or between the engines 102, 104 and the gearbox 106. The clutches can be any type of clutch configuration suitable for the operating speeds and conditions of the dual-engine system 100. The dual-engine system 100 can be controlled by one or more aircraft level controls and/or local control systems. Further, control of the dual-engine system 100 can be integrated with controls of one or more other engines or systems of the aircraft.

The combination of the smaller booster engine 104 adjacent the main sustainer engine 102 results in package that can fit in different parts of the aircraft as compared to a larger sustainer engine without the booster engine 104. In the example of FIG. 1, a centerline CSE of the sustainer engine 102 is parallel to a centerline CBE of the booster engine 104 when both the sustainer engine 102 and the booster engine 104 are coupled to the gearbox 106. Further, as depicted in the example of FIG. 1, both the sustainer engine 102 and the booster engine 104 can be mounted on a same side 120 of the gearbox 106, while other components, such as the generator 108, starter/pump 110, fuel pump 114, and oil pump 116 can be mounted on an opposite side 122 of the gearbox 106.

Figure 2:
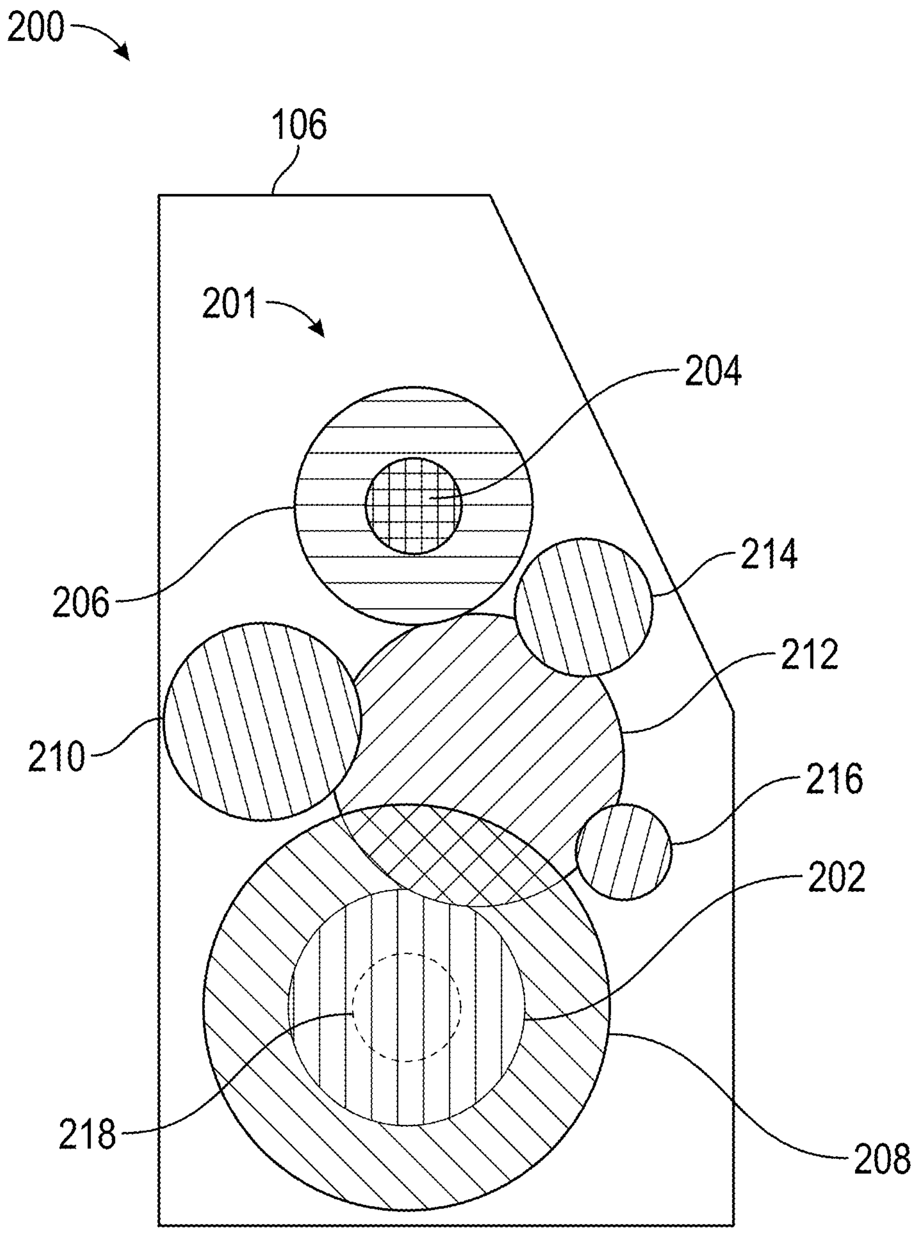
FIG. 2 is a schematic illustration of a gearbox system in accordance with an embodiment of the disclosure.

FIG. 2 depicts a gearbox system 200 in accordance with an embodiment. The gearbox system 200 can include the gearbox 106 of FIG. 1 with a geartrain 201. The geartrain 201 can include a sustainer engine interface 202, a booster engine interface 204, a booster clutch 206, a generator interface 208, a starter/pump interface 210, an idler 212, a fuel pump interface 214, and an oil pump interface 216. The sustainer engine interface 202 is configured to couple the sustainer engine 102 of FIG. 1 to the geartrain 201. In some embodiments, a sustainer clutch 218 may be installed between the sustainer engine interface 202 and the sustainer engine 102, or the sustainer engine interface 202 may include the sustainer clutch 218. The booster engine interface 204 is configured to couple the booster engine 104 of FIG. 1 to the geartrain 201. The booster engine interface 204 can be operably coupled to the booster clutch 206 to selective engage and disengage the booster engine 104 output with respect to other components of the geartrain 201. The generator interface 208 is configured to couple the generator 108 of FIG. 1 to the geartrain 201. The starter/pump interface 210 is configured to couple the starter/pump 110 of FIG. 1 to the geartrain 201. The idler 212 can interlink various gears and gearsets within the geartrain 201. The fuel pump 114 of FIG. 1 can be driven by the geartrain 201 through the fuel pump interface 214 to pump fuel to either or both of the sustainer engine 102 and the booster engine 104. Thus, the fuel pump 114 may be referred to as a common fuel pump that is configured to supply fuel to both the sustainer engine 102 and the booster engine 104. The oil pump 116 of FIG. 1 can be driven by the geartrain 201 through the oil pump interface 216 to pump oil to either or both of the sustainer engine 102 and the booster engine 104. Thus, the oil pump 116 may be referred to as a common oil pump that is configured to supply oil to both the sustainer engine 102 and the booster engine 104. Alternatively, either or both of the fuel pump 114 and the oil pump 116 can be electrically driven. When the fuel pump 114 and/or the oil pump 116 are electrically driven, each can still be shared by both the sustainer engine 102 and the booster engine 104 such that the fuel pump 114 provides fuel to both the sustainer engine 102 and the booster engine 104, and the oil pump 116 supplies oil to both the sustainer engine 102 and the booster engine 104.

Although a particular configuration of the geartrain 201 is depicted in FIG. 2, it will be understood that variations are contemplated, such as additional interfaces, combined interfaces, subdivision of components, and/or a reduction of components. Further, the geartrain 201 can include various gear ratios and may use a variety of gear architectures, such as planetary gearsets, depending on interfacing needs of the gearbox system 200. Additional components or aircraft subsystems can be driven by the gearbox system 200 directly or through one or more couplings.

In summary, the sustainer engine 102 and booster engine 104 are not redundant main engines, such as a twin turbine drive of a primary propulsion system. For instance, a redundant engine configuration would likely include engines of equivalent size, power output, and independent accessory systems. In contrast, the sustainer engine 102 and booster engine 104 can have different sizes, power output capabilities, and can share components, such as fuel pump 114 and oil pump 116. The gearbox 106 may have multiple output shafts to provide rotary power, such as an output for power generation and an output to drive a propulsor. The sustainer engine 102 and booster engine 104 may augment thrust or lift of an aircraft, but the dual-engine system 100 may be sized such that it is not strong enough to provide all thrust or lift for the aircraft.

The sustainer engine 102 may be sized to provide sufficient power output for electrical and thrust demands in most operations. However, if the aircraft requires increased power, the booster clutch 206 can activate, and the booster engine 104 can come online to boost the total power output of the dual-engine system 100.

Figure 3:
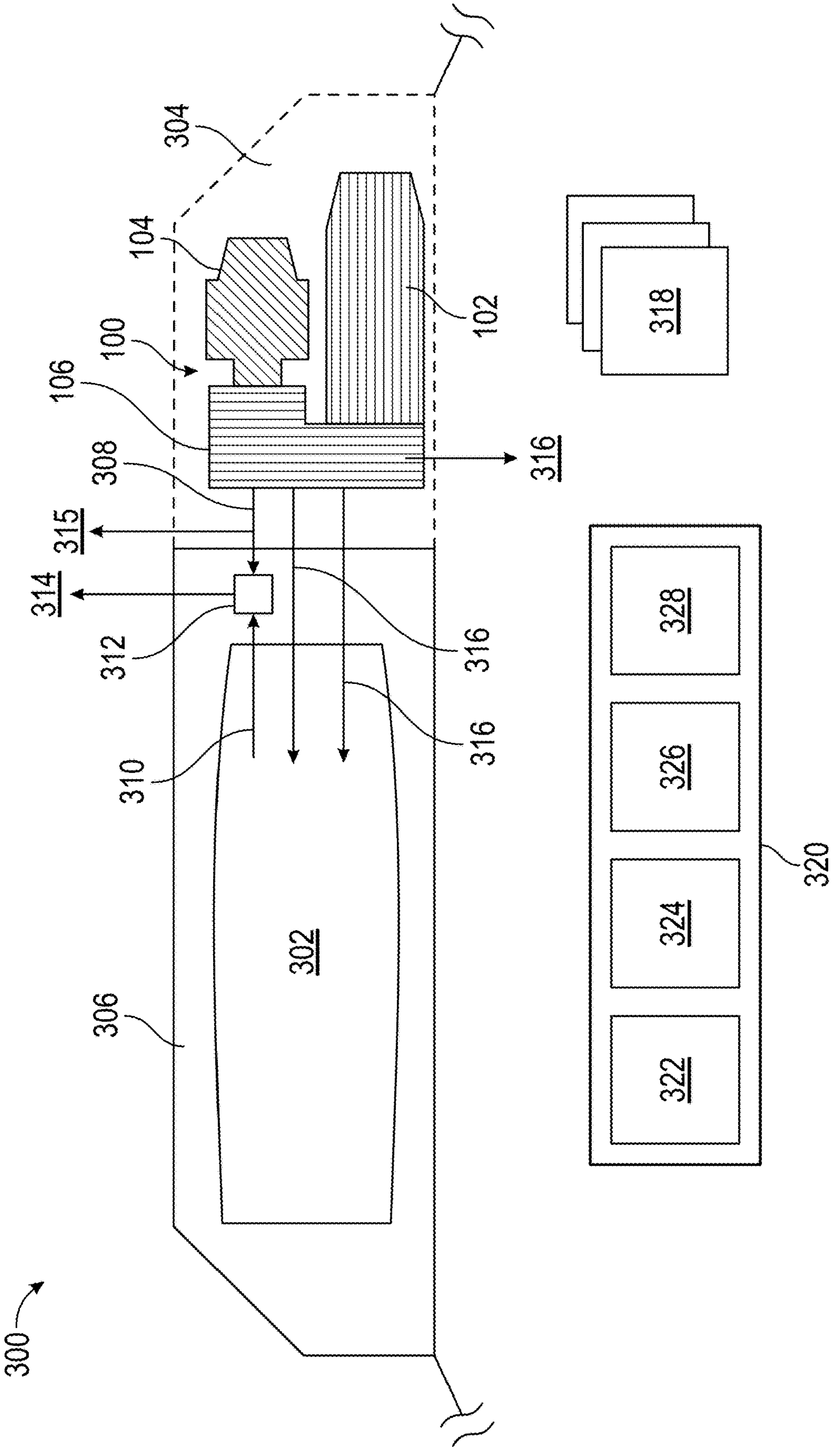
FIG. 3 is a schematic illustration of an aircraft including at least one main engine and a dual-engine system in accordance with an embodiment of the disclosure.

FIG. 3 is a schematic illustration of an aircraft 300 including at least one main engine 302 and the dual-engine system 100 of FIG. 1 in accordance with an embodiment. The dual-engine system 100 can be installed in an aircraft location 304 of the aircraft 300 that is separate from an aircraft location 306 of the at least one main engine 302. Alternatively, the aircraft locations 304 and 306 may be a common compartment or housing. The at least one main engine 302 is configured to provide propulsion for the aircraft 300, where the propulsion can be in a horizontal direction, a vertical direction, or a combination thereof. As previously described, the dual-engine system 100 includes sustainer engine 102, booster engine 104 configured to augment a power output of the sustainer engine 102, and gearbox 106 coupled to the sustainer engine 102 and the booster engine 104. One or more outputs of the gearbox 106 are configured to selectively combine the power output of the sustainer engine 102 with the booster engine 104. For example, a supplemental propulsion output 308 of the dual-engine system 100 can combine with a primary propulsion output 310 of the at least one main engine 302 at a power coupler 312 to drive a propulsor 314 of the aircraft 300. The supplemental propulsion output 308 can be a shaft driven to rotate through the gearbox 106, the primary propulsion output 310 can be a shaft driven to rotate by the at least one main engine 302, and the power coupler 312 can be a geared interface configured to drive rotation of the propulsor 314. The propulsor 314 can be a propeller, a rotary wing, a fan, or other such component capable of providing thrust/lift for the aircraft 300. Further, the supplemental propulsion output 308 may drive a propulsion component 315 that is independent of the propulsor 314. For example, the propulsion component 315 may be an auxiliary rotating component for supplemental or backup lift, thrust, stabilization, and/or other uses.

The dual-engine system 100 can also generate outputs 316 for the at least one main engine 302 and/or one or more subsystems 318 of the aircraft 300, such as bleed air from the sustainer engine 102, electrical power from the generator 108, hydraulic power, and/or other types of aircraft power outputs. Examples of the subsystems 318 can include various avionics, air management systems, flight controls, and the like.

A controller 320 can be control operation of the dual-engine system 100 and may be a dedicated control or part of an engine control, such as a full authority digital engine control (FADEC). The controller 320 can include, for example, a processing system 322, a memory system 324, an input/output interface 326, and control logic 328.

The processing system 322 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 324 can store data and instructions that are executed by the processing system 322. In embodiments, the memory system 324 may include random access memory (RAM), read only memory (ROM), or other electronic, optical, magnetic, or any other computer readable medium onto which is stored data and algorithms in a non-transitory form. The input/output interface 326 is configured to collect sensor data from one or more system sensors, send output signals to one or more effectors, and interface with various components and subsystems of the dual-engine system 100 and/or the at least one main engine 302. The controller 320 can provide a means for controlling various aspects of the aircraft 300. The means for controlling the aircraft 300 can be otherwise subdivided, distributed, or combined with other control elements.

As one example, the controller 320 can apply control laws and access/update models to determine how to control operation of the dual-engine system 100 and/or other aircraft components. For example, sensed and/or derived parameters related to speeds, flow rates, pressure ratios, altitude, temperature, thrust, and the like can be used to establish operational schedules and transition limits to maintain efficient operation of the dual-engine system 100 relative to performance of the at least one main engine 302. For instance, a mode of operation of the aircraft 300, such as idle, takeoff, climb, cruise, and descent can have different power demands, thrust requirements, response time requirements, and temperature effects.

Control logic 328 can include instructions executable by the processing system 322 and/or circuitry to control one or more aspects of the dual-engine system 100. Control aspects can include sequencing the operation and engagement of the sustainer engine 102, the booster engine 104, and the at least one main engine 302. For example, there can be a minimum thrust at which the booster engine 104 operates. When there is a command for more thrust than the sustainer engine 102 can deliver, the booster engine 104 can be brought online to provide supplemental power. Further, the control logic 328 may use predictive modeling to start the booster engine 104 before an increased power demand is detected, and then upon detecting the demand, the booster clutch 206 can be used to engage the booster engine 104 with the geartrain 201 of FIG. 2 to provide the booster power with reduced delay. Further, there may be a regime where the power of the sustainer engine 102 is reduced after the booster engine 104 comes online to match the power output of the dual-engine system 100 with the power demand Other control aspects are contemplated with respect to the demands of the at least one main engine 302 and/or one or more subsystems 318 of the aircraft 300.

Figure 4:
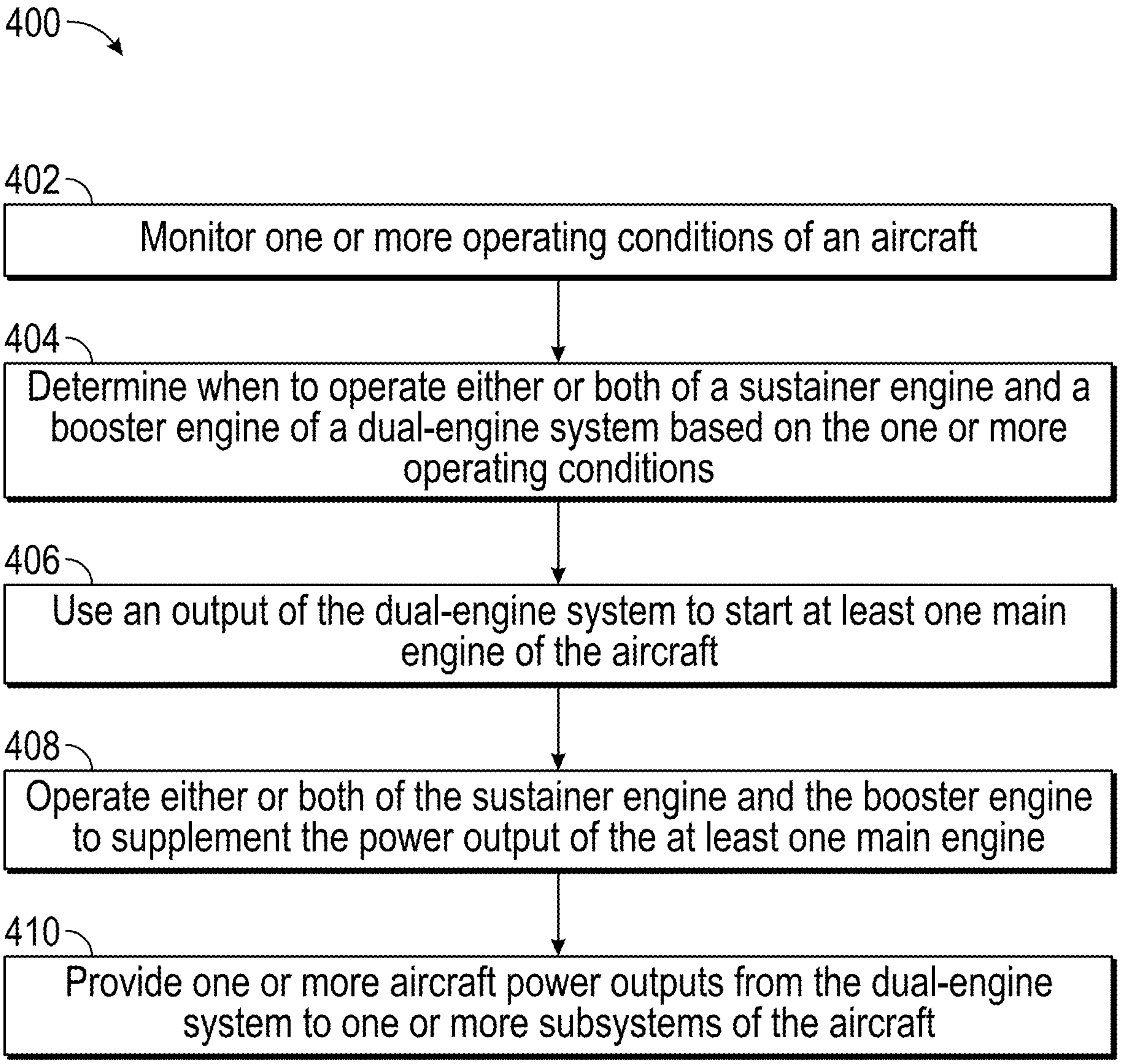
FIG. 4 is a flow chart illustrating a method, in accordance with an embodiment of the disclosure.

Referring now to FIG. 4 with continued reference to FIGS. 1-3, FIG. 4 is a flow chart illustrating a method 400 for operating a dual-engine system, in accordance with an embodiment. The method 400 may be performed, for example, by the dual-engine system 100 of FIG. 1 in combination with various components of the aircraft 300 of FIG. 3. For purposes of explanation, the method 400 is described primarily with respect to the dual-engine system 100 and gearbox system 200 of FIG. 2; however, it will be understood that the method 400 can be performed on other configurations (not depicted).

At block 402, the controller 320 can monitor one or more operating conditions of the aircraft 300. The operating conditions can include power demands, flight regime, environmental conditions, and other such aspects that impact output needs of the dual-engine system 100.

At block 404, the controller 320 can determine when to operate either or both of the sustainer engine 102 and the booster engine 104 of the dual-engine system 100 based on the one or more operating conditions. For example, if the output capabilities of the sustainer engine 102 are sufficient for the operating conditions, then the booster engine 104 can remain offline, either turned off or disengaged through the booster clutch 206. If the operating conditions are determined to have a power demand beyond the capabilities of the sustainer engine 102, then the booster engine 104 can be engaged to drive additional power into the geartrain 201 of the gearbox 106.

At block 406, if the at least one main engine 302 needs to be started, then an output 316 of the dual-engine system 100 can be used to start the at least one main engine 302. For example, the controller 320 can operate the sustainer engine 102 to generate bleed air as the output 316, and the bleed air can drive rotation of the at least one main engine 302 to support starting of the at least one main engine 302. If the at least one main engine 302 has an electric start system, the controller 320 can operate the sustainer engine 102 to drive the generator 108 to produce electric power to start the at least one main engine 302.

In some embodiments, the booster engine 104 can be started prior to starting the sustainer engine 102 for the lowest initial power demand and fastest spin up. Since the booster engine 104 can be the smallest powerhead, the booster engine 104 may start faster. In such a scenario, the sustainer clutch 218 can disengage the sustainer engine 102 such that fuel and oil pressure are provided by the booster engine 104 driving the fuel pump 114 and the oil pump 116 prior to starting the sustainer engine 102. After the booster engine 104 drives the fuel pump 114 and the oil pump 116 to pressure, the sustainer engine 102 can be brought online to provide bleed air and/or electricity from the generator 108 to start the at least one main engine 302.

At block 408, the controller 320 can operate either or both of the sustainer engine 102 and the booster engine 104 to supplement the power output of the at least one main engine 302. Supplementing of the power output can include providing a portion of the propulsive power to the propulsor 314, providing rotary power, electrical power, pneumatic power, hydraulic power, or other such power outputs from the dual-engine system 100.

At block 410, the dual-engine system 100 can provide one or more aircraft power outputs to one or more subsystems 318 of the aircraft 300. For example, the output 316 to the one or more subsystems 318 can include electric power for lighting, controls, communication systems, and the like. Pneumatic output can be used to support one or more air cycle machines for cabin pressurization, heating, cooling, and the like. Hydraulic output can be used actuate one or more flight control surfaces or other such components of the aircraft 300.

While the above description has described the flow process of FIG. 4 in a particular order, it should be appreciated that unless otherwise specifically required in the attached claims that the ordering of the steps may be varied. Also, it is clear to one of ordinary skill in the art that, the elements described herein can be combined with and enhance other systems (not depicted).

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A dual-engine system of an aircraft comprising at least one main engine, the dual-engine system comprising:

a sustainer engine;

a booster engine configured to augment a power output of the sustainer engine;

a gearbox coupled to the sustainer engine and the booster engine, wherein an output of the gearbox is configured to selectively combine the power output of the sustainer engine with a power output of the booster engine;

a shaft driven to rotate through the gearbox as a propulsion output based on the power output of the sustainer engine as selectively combined with the power output of the booster engine within the gearbox; and a controller configured to control operation of either or both of the sustainer engine and the booster engine based on determining whether one or more operating conditions have a power demand beyond an output capability of the sustainer engine and determining the power demand is beyond the output capability of the sustainer engine and operating both the sustainer engine and the booster engine to meet the power demand.

2. The dual-engine system of claim 1, further comprising a booster clutch configured to selectively couple the booster engine to a geartrain of the gearbox.

3. The dual-engine system of claim 1, further comprising a sustainer clutch configured to selectively couple the sustainer engine to a geartrain of the gearbox.

4. The dual-engine system of claim 1, further comprising a generator coupled to the gearbox.

5. The dual-engine system of claim 1, wherein the sustainer engine is configured to generate bleed air for the aircraft.

6. The dual-engine system of claim 5, wherein the dual-engine system is configured to supplement a power output of the at least one main engine of the aircraft through the shaft.

7. The dual-engine system of claim 1, wherein the gearbox comprises a sustainer engine interface, a booster engine interface, a generator interface, and a pump/starter interface.

8. The dual-engine system of claim 7, further comprising:

a fuel pump coupled to the gearbox and configured to supply fuel to both the sustainer engine and the booster engine; and an oil pump coupled to the gearbox and configured to supply oil to both the sustainer engine and the booster engine.

9. A system of an aircraft, the system comprising:

at least one main engine configured to provide propulsion for the aircraft;

a dual-engine system comprising:

a sustainer engine;

a booster engine configured to augment a power output of the sustainer engine;

a gearbox coupled to the sustainer engine and the booster engine, wherein an output of the gearbox is configured to selectively combine the power output of the sustainer engine with a power output of the booster engine; and a shaft driven to rotate through the gearbox as a propulsion output based on the power output of the sustainer engine as selectively combined with the power output of the booster engine within the gearbox; and a controller configured to selectively operate either or both of the sustainer engine and the booster engine to supplement a power output of the at least one main engine, wherein the controller is configured to control operation of either or both of the sustainer engine and the booster engine based on determining whether the one or more operating conditions have a power demand beyond an output capability of the sustainer engine and determining the power demand is beyond the output capability of the sustainer engine and operating both the sustainer engine and the booster engine to meet the power demand.

10. The system of claim 9, wherein the controller is configured to monitor one or more operating conditions of the aircraft and determine when to operate either or both of the sustainer engine and the booster engine based on the one or more operating conditions.

11. The system of claim 9, wherein the controller is configured to start the booster engine prior to starting the sustainer engine.

12. The system of claim 11, further comprising a fuel pump and an oil pump coupled to the gearbox, wherein the booster engine is configured to drive the fuel pump and the oil pump prior to starting the sustainer engine.

13. The system of claim 9, wherein the sustainer engine is configured to provide bleed air and/or drive a generator to start the at least one main engine.

14. The system of claim 9, further comprising a power coupler comprising a geared interface configured to drive a propulsor of the aircraft, wherein the gearbox is configured to provide the propulsion output of the shaft as a supplemental propulsion output to combine with a primary propulsion output of the at least one main engine at the power coupler, and wherein the supplemental propulsion output drives a propulsion component that is independent of the propulsor.

15. A method comprising:

providing at least one main engine configured to provide propulsion for an aircraft and a dual-engine system comprising: a sustainer engine; a booster engine configured to augment a power output of the sustainer engine; a gearbox coupled to the sustainer engine and the booster engine, a shaft driven to rotate through the gearbox as a propulsion output and a controller configured to control the booster engine and the sustainer engine;

monitoring one or more operating conditions of the aircraft;

determining, by the controller, when to operate either or both of the sustainer engine and the booster engine of a dual-engine system based on the one or more operating conditions;

operating either or both of the sustainer engine and the booster engine to supplement a power output of the at least one main engine of the aircraft using the shaft driven to rotate through the gearbox as the propulsion output based on the power output of the sustainer engine as selectively combined with the power output of the booster engine within the gearbox, wherein the controller is configured to control operation of either or both of the sustainer engine and the booster engine based on determining whether the one or more operating conditions have a power demand beyond an output capability of the sustainer engine; and determining the power demand is beyond the output capability of the sustainer engine and in response, operating, by the controller, both the sustainer engine and the booster engine to meet the power demand.

16. The method of claim 15, further comprising:

using an output of the dual-engine system to start the at least one main engine.

17. The method of claim 15, further comprising:

starting the booster engine prior to starting the sustainer engine; and driving, by the booster engine, a fuel pump and an oil pump coupled to the gearbox prior to starting the sustainer engine.

18. The method of claim 15, further comprising:

driving rotation of the sustainer engine, by the booster engine, through the gearbox to output bleed air from the sustainer engine in an emergency mode of operation.

19. The method of claim 15, further comprising:

combining the propulsion output of the shaft as a supplemental propulsion output of the dual-engine system with a primary propulsion output of the at least one main engine.

20. The method of claim 15, further comprising:

providing one or more aircraft power outputs from the dual-engine system to one or more subsystems of the aircraft.

* * * * *